US007769526B2

(12) United States Patent
Chen et al.

(10) Patent No.: US 7,769,526 B2
(45) Date of Patent: Aug. 3, 2010

(54) DIESEL TRANSIENT COMBUSTION CONTROL BASED ON INTAKE CARBON DIOXIDE CONCENTRATION

(75) Inventors: Qian Chen, Rochester, MI (US); Tim Chang, West Bloomfield, MI (US); Hongxun Gao, Troy, MI (US)

(73) Assignee: GM Global Technology Operations, Inc.

( * ) Notice: Subject to any disclaimer, the term of this patent is extended or adjusted under 35 U.S.C. 154(b) by 273 days.

(21) Appl. No.: 12/115,795

(22) Filed: May 6, 2008

(65) Prior Publication Data

US 2009/0055078 A1   Feb. 26, 2009

Related U.S. Application Data

(60) Provisional application No. 60/956,982, filed on Aug. 21, 2007.

(51) Int. Cl.
*G06F 19/00* (2006.01)
*F02D 41/14* (2006.01)
*F02M 51/00* (2006.01)

(52) U.S. Cl. ........................ 701/104; 123/704
(58) Field of Classification Search ................. 123/1 A, 123/478, 480, 494, 585, 698, 703, 704; 701/101–105, 701/109, 114, 115; 60/274, 276, 278, 279
See application file for complete search history.

(56) References Cited

U.S. PATENT DOCUMENTS

| 2,747,560 | A | * | 5/1956 | Rounds et al. | 123/577 |
| 2,914,424 | A | * | 11/1959 | Murray | 427/237 |
| 3,697,240 | A | * | 10/1972 | Hori et al. | 44/446 |
| 4,201,178 | A | * | 5/1980 | Tyrer et al. | 123/198 D |
| 6,119,660 | A | * | 9/2000 | Suzuki | 123/550 |
| 7,493,884 | B2 | * | 2/2009 | Hu | 123/1 A |
| 2002/0104697 | A1 | * | 8/2002 | Hatanaka | 180/65.4 |

* cited by examiner

*Primary Examiner*—Willis R Wolfe, Jr.

(57) ABSTRACT

An engine control module includes a target intake carbon dioxide (CO2) module that determines a target intake CO2 concentration. An intake CO2 estimation module estimates an actual intake CO2 concentration. The engine control module adjusts fuel injection based on the target intake CO2 concentration and the actual intake CO2 concentration.

26 Claims, 4 Drawing Sheets

DIESEL TRANSIENT COMBUSTION CONTROL BASED ON INTAKE CARBON DIOXIDE CONCENTRATION

CROSS-REFERENCE TO RELATED APPLICATIONS

This application claims the benefit of U.S. Provisional Application No. 60/956,982, filed on Aug. 21, 2007. The disclosure of the above application is incorporated herein by reference.

FIELD

The present disclosure relates to engine control systems, and more particularly to a diesel engine control during transient conditions.

BACKGROUND

Exhaust gas recirculation (EGR) is a technique used in diesel engines to achieve low emission of nitrogen oxides (NOx). An EGR technique introduces a portion of engine exhaust gas back to the engine cylinders. The carbon dioxide (CO2) introduced through EGR works as a dilutant and a heat absorbing component in the combustion gas that reduces combustion temperature and consequently lowers NOx emission. Higher CO2 concentration in the combustion gas leads to lower NOx emission and higher hydrocarbon (HC) emission. CO2 concentration in the combustion gas is therefore a factor affecting diesel combustion emissions.

Fuel injection timing is another factor that affects the emission levels of a diesel combustion engine. Advanced injection timing normally results in higher cylinder pressure and temperature and therefore leads to lower HC emissions and higher NOx emissions. Retarded injection timing may result in incomplete combustion of fuel and therefore higher HC emissions and lower NOx emissions. Optimal fuel injection timing is determined based on the condition of the combustion gas (e.g. CO2 concentration). A mismatch between injection timing and combustion gas condition generally leads to poor emissions.

Diesel combustion control calibration takes into account both CO2 concentration and injection timing. For each engine operating point (engine speed vs. load), a target combustion gas condition (i.e. CO2 concentration) is determined by specifying a target mass air flow (MAF). The fuel injection timing is calibrated under the target combustion gas condition for optimized emissions. In steady state operations, reaching the target MAF provides for the target combustion gas condition. During transient operations of the engine, the actual combustion gas condition often deviates from the target condition even if the engine is following the target MAF. Since engine control systems use the fuel injection timing calibrated for the steady state condition, a mismatch between fuel injection timing and combustion gas condition occurs during transient diesel engine operation. The mismatch leads to high emission levels of NOx and HC.

SUMMARY

An engine control module includes a target intake carbon dioxide (CO2) module that determines a target intake CO2 concentration. An intake CO2 estimation module estimates an actual intake CO2 concentration. The engine control module adjusts fuel injection based on the target intake CO2 concentration and the actual intake CO2 concentration.

BRIEF DESCRIPTION OF THE DRAWINGS

The drawings described herein are for illustration purposes only and are not intended to limit the scope of the present disclosure in any way.

DETAILED DESCRIPTION

Figure 1:
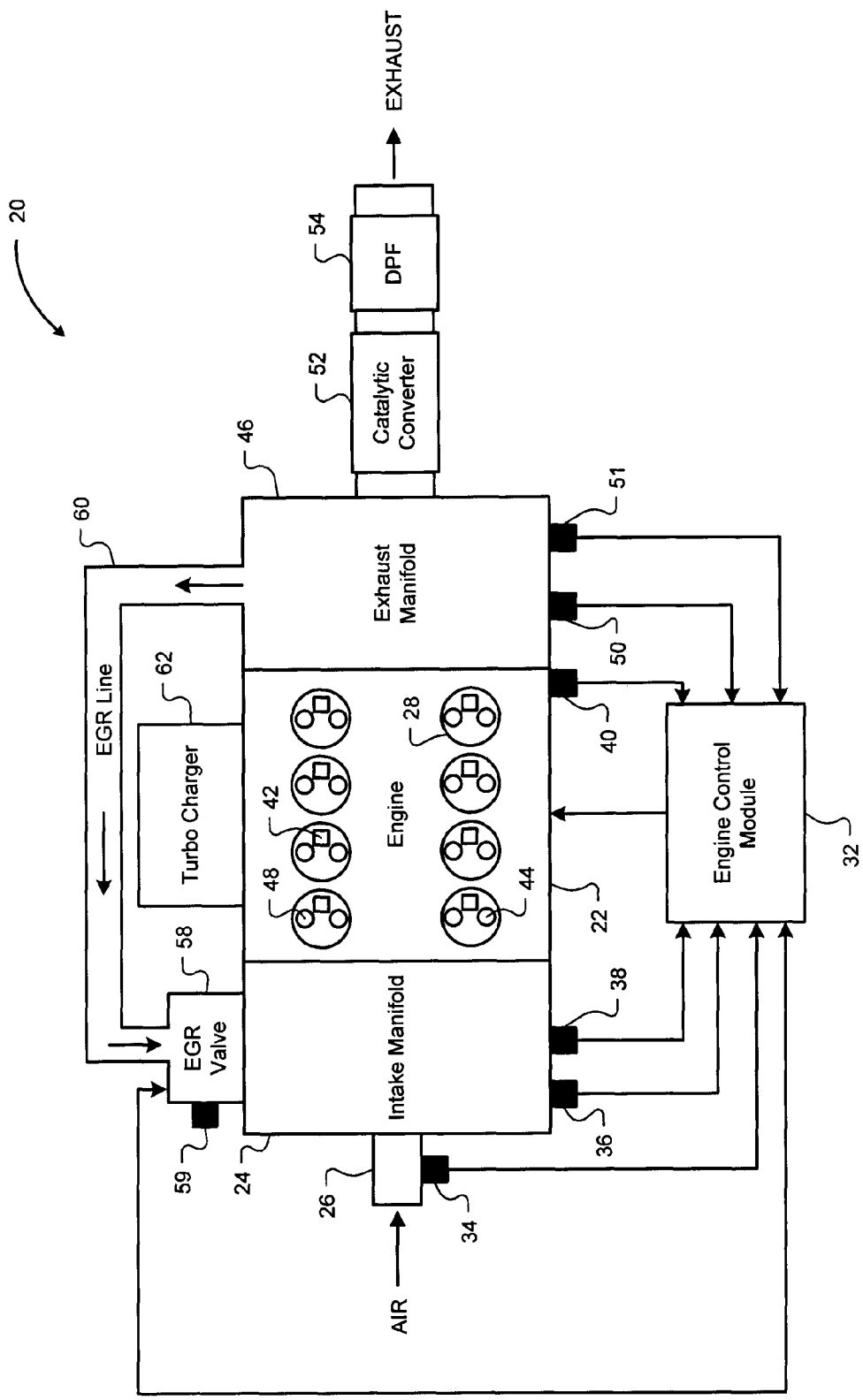
FIG. 1 is a functional block diagram of a diesel engine system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Typically, diesel combustion control is based on steady state engine operating conditions. Engine control based on steady state operation results in high emission levels of nitrous oxides (NOx) and hydrocarbons (HC) during transient diesel engine operation. A transient combustion control system according to the present disclosure adjusts fuel injection timing to compensate for transient operation. Adjusted fuel injection timing results in decreased emissions of NOx and HC.

Referring to FIG. 1, a diesel engine system 20 includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts eight cylinders, it is appreciated that the engine 22 may include additional or fewer cylinders 28. For example, engines having 4, 5, 6, 10, 12 and 16 cylinders are contemplated.

The engine system 20 includes an engine control module 32 that communicates with components of the engine system 20, such as the engine 22 and associated sensors and controls as discussed herein. The engine control module 32 may implement the transient combustion control system of the present disclosure.

Air is passed from the inlet 26 through a mass airflow sensor 34, such as a conventional mass airflow meter. The sensor 34 generates a mass airflow (MAF) signal that indicates a rate of air flowing through the sensor 34. A manifold pressure sensor 36 is positioned in the engine intake manifold 24 between the inlet 26 and the engine 22. The manifold pressure sensor 36 generates a manifold absolute air pressure (MAP) signal. A manifold air temperature sensor 38 that generates a manifold air temperature (MAT) signal based on intake air temperature may also be located in the engine intake manifold 24.

An engine crankshaft (not shown) rotates at engine speed or a rate that is proportional to the engine speed. A crankshaft sensor 40 senses the position of the crankshaft and generates a crankshaft position (CSP) signal. The CSP signal may be related to the rotational speed of the crankshaft and cylinder events. The crankshaft sensor 40 may be a conventional variable reluctance sensor. Skilled artisans will appreciate that there are other suitable methods of sensing engine speed and cylinder events.

The engine control module 32 electronically controls fuel injectors 42 to inject fuel into the cylinders 28. An intake valve 44 selectively opens and closes to enable air to enter the cylinder 28. A camshaft (not shown) regulates intake valve position. A piston (not shown) compresses the air/fuel mixture within the cylinder 28. The piston drives the crankshaft during a power stroke to produce drive torque. Combustion exhaust within the cylinder 28 is forced out through an exhaust manifold 46 when an exhaust valve 48 is in an open position. A camshaft (not shown) regulates exhaust valve position. An exhaust manifold pressure sensor 50 generates an exhaust manifold air pressure signal (EMP). An exhaust manifold air temperature sensor 51 generates an exhaust manifold air temperature (EMT) signal.

A catalytic converter 52 and a diesel particulate filter (DPF) 54 treat exhaust gas. An exhaust gas recirculation (EGR) system that includes an EGR valve 58 and an EGR line 60 introduces exhaust gas into the intake manifold 24. The EGR valve 58 may be mounted on the intake manifold 24 and the EGR line 60 may extend from the exhaust manifold 46 to the EGR valve 58 providing communication between the exhaust manifold 46 and the EGR valve 58. The engine control module 32 electronically controls a position of the EGR valve 58. An EGR valve position sensor 59 generates an EGR valve position (EGRP) signal.

The engine 22 may include a turbo charger 62. The turbo charger 62 may be in communication with both the exhaust manifold 46 and the intake manifold 24. The turbo charger 62 provides an increased air flow rate to the intake manifold 24. The increased airflow rate causes an increase in intake manifold pressure (i.e. boost pressure).

Figure 2:
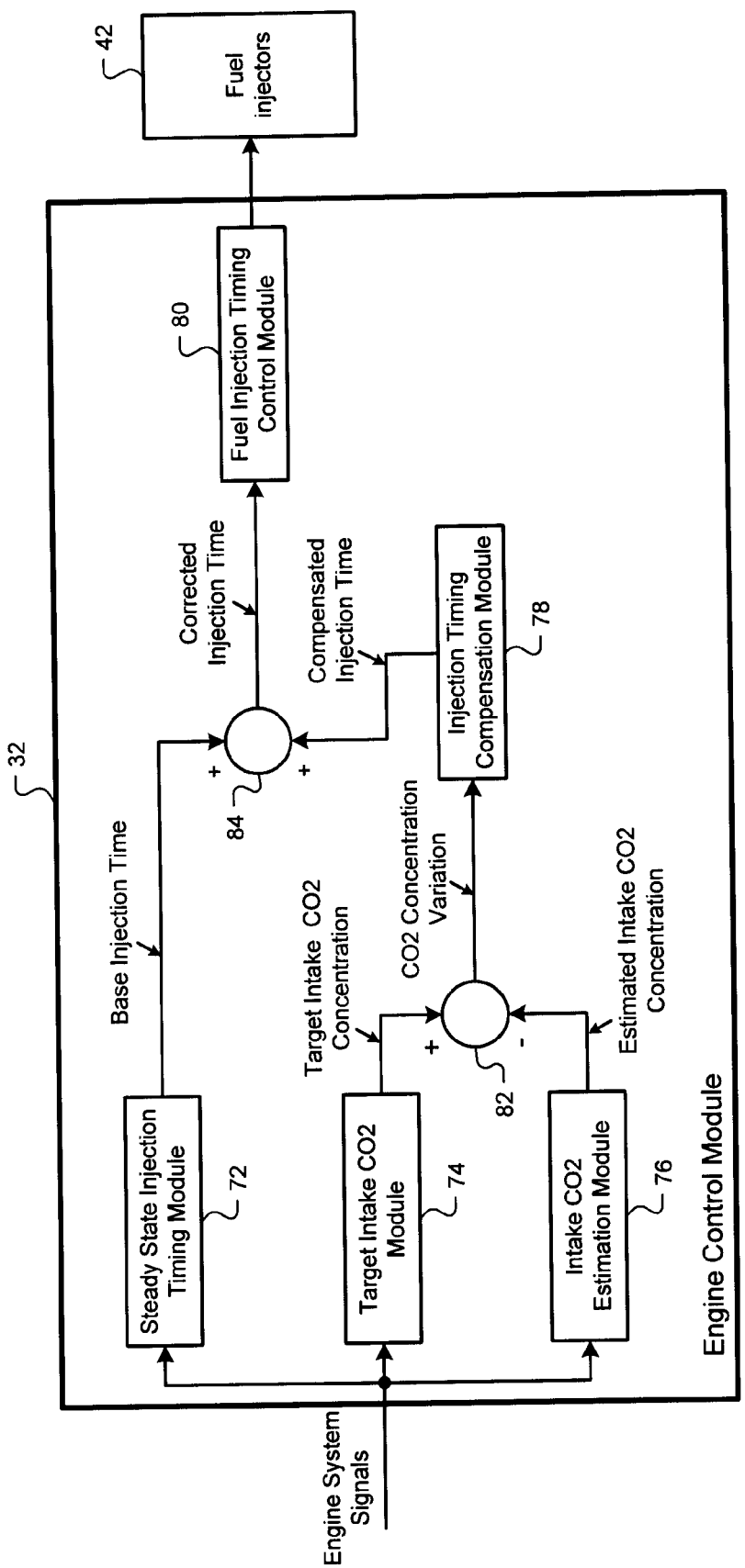
FIG. 2 is a functional block diagram of an engine control module according to the present disclosure.

Referring to FIG. 2, the engine control module 32 includes a steady state injection timing module 72, a target intake carbon dioxide ($CO_2$) module 74, an intake $CO_2$ estimation module 76, an injection timing compensation module 78, and a fuel injection timing control module 80. The engine control module 32 receives input signals from the diesel engine system 20 including, but not limited to, the MAF, MAP, MAT, CSP, EMP, EGRP, and EMT signals (hereinafter, "engine system signals"). The engine control module 32 processes the engine system signals and generates timed engine control commands that are output to the diesel engine system 20. Engine control commands may include signals that control the fuel injectors 42 and the EGR valve 58.

The engine control module 32 determines steady state calibration based on a steady state combustion gas condition (e.g. $CO_2$ concentration) corresponding to a steady state engine operating point (i.e. engine speed vs. load). The steady state combustion gas condition may be based on a target MAF signal. The steady state engine operating point may be determined from engine signals (e.g. CSP, MAF, and MAP signals). The steady state injection timing module 72 determines a base injection time based on steady state calibration. The base injection time may be the calculated fuel injector timing when the engine is operating at steady state. The target intake $CO_2$ module 74 determines a target intake $CO_2$ concentration based on steady state calibration. The target intake $CO_2$ concentration may be the intake $CO_2$ concentration in the intake manifold 24 when the engine is operating at steady state.

The actual intake $CO_2$ concentration may differ from the target intake $CO_2$ concentration during transient operation. The intake $CO_2$ estimation module 76 determines an estimated intake $CO_2$ concentration. The estimated intake $CO_2$ concentration is an estimate of the real-time actual $CO_2$ concentration in the intake manifold. The estimated intake $CO_2$ concentration may be based on engine control commands (e.g. fuel injection and EGR valve signals), engine system signals (e.g. MAF, MAP, MAT, EMP, EMT and EGRP signals), and/or models.

The injection timing compensation module 78 determines a compensated injection time based on a $CO_2$ concentration variation due to transient engine operation. The engine control module 32 calculates the difference in target intake $CO_2$ concentration and estimated intake $CO_2$ concentration to determine the $CO_2$ concentration variation, as indicated at 82. Compensated injection time compensates for $CO_2$ concentration variation so that the actual fuel injection timing more accurately corresponds to actual $CO_2$ concentration.

The fuel injection timing control module 80 controls the fuel injectors 42 according to a corrected injection time. The engine control module 32 determines the corrected injection time based on the base injection time and the compensated injection time, as indicated at 84. The corrected injection time may be the sum of the base injection time and the compensated injection time. The fuel injection timing control module 80 controls the fuel injectors 42 to inject fuel into the cylinder 28 based on the corrected injection time.

Figure 3:
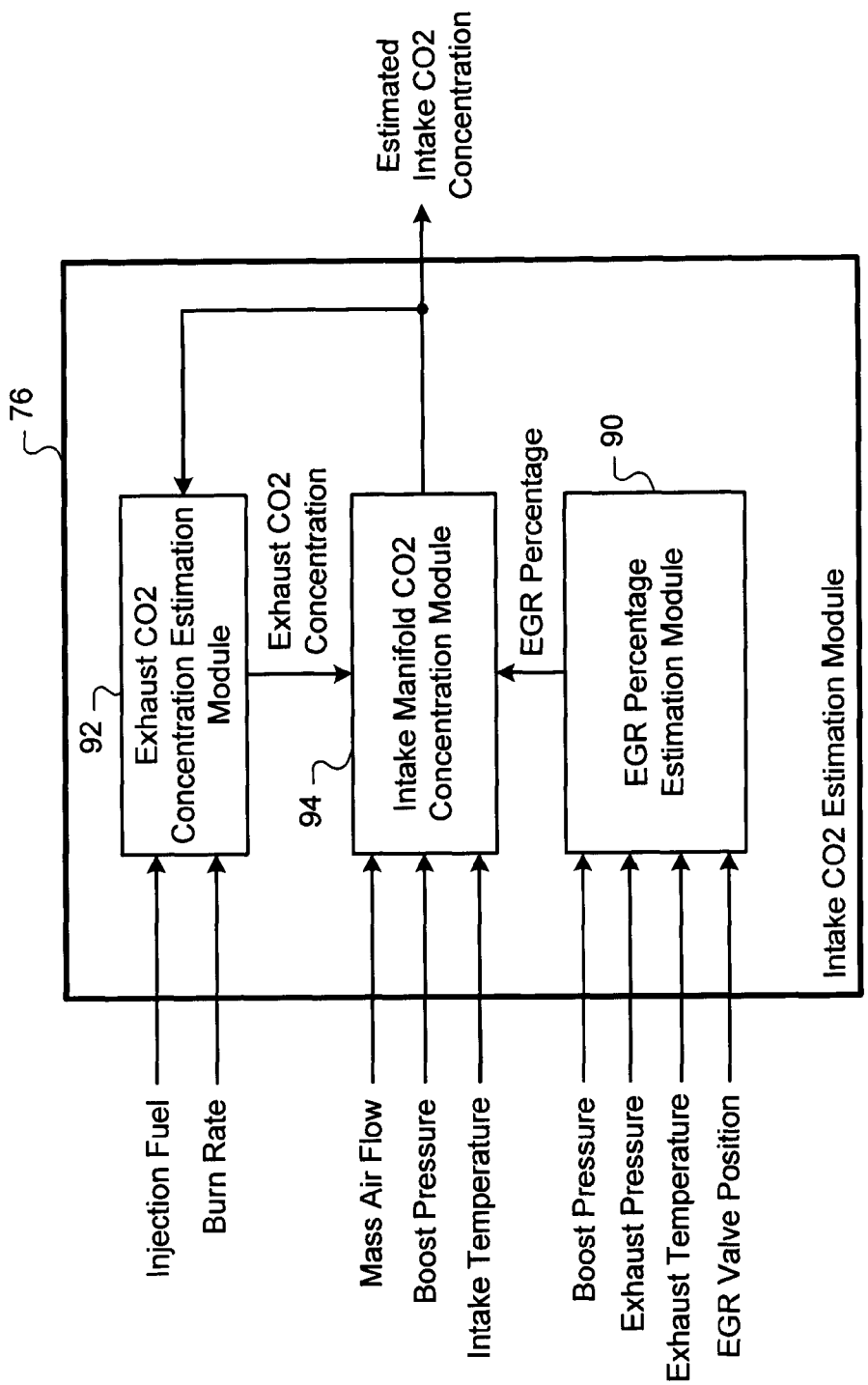
FIG. 3 is a functional block diagram of an intake CO2 estimation module according to the present disclosure.

Referring to FIG. 3, an exemplary intake $CO_2$ estimation module 76 includes an EGR percentage estimation module 90, an exhaust $CO_2$ concentration estimation module 92, and an intake manifold $CO_2$ concentration module 94. The EGR percentage estimation module 90 may determine the percentage of EGR introduced into the combustion gas based on engine system signals (e.g. MAP, EMP, EMT, and EGRP signals) and engine commands (e.g. EGR valve signals). The exhaust $CO_2$ concentration estimation module 92 may determine exhaust $CO_2$ concentration based on injection timing and burn rate. Burn rate refers to the rate at which fuel and air are consumed. Burn rate may be determined based on engine system signals and models. Burn rate models may include functions based on combustion parameters at selected engine operating conditions. Further, the exhaust $CO_2$ concentration estimation module 92 may determine exhaust $CO_2$ concentration based on previously estimated intake $CO_2$ concentration values. The intake manifold $CO_2$ concentration module 94 may determine the estimated intake $CO_2$ concentration based on the EGR percentage, exhaust $CO_2$ concentration, and engine system signals (e.g. MAF, MAP, and MAT signals). The estimated intake $CO_2$ concentration is indicative of the real time actual $CO_2$ concentration in the intake manifold 24.

Figure 4:
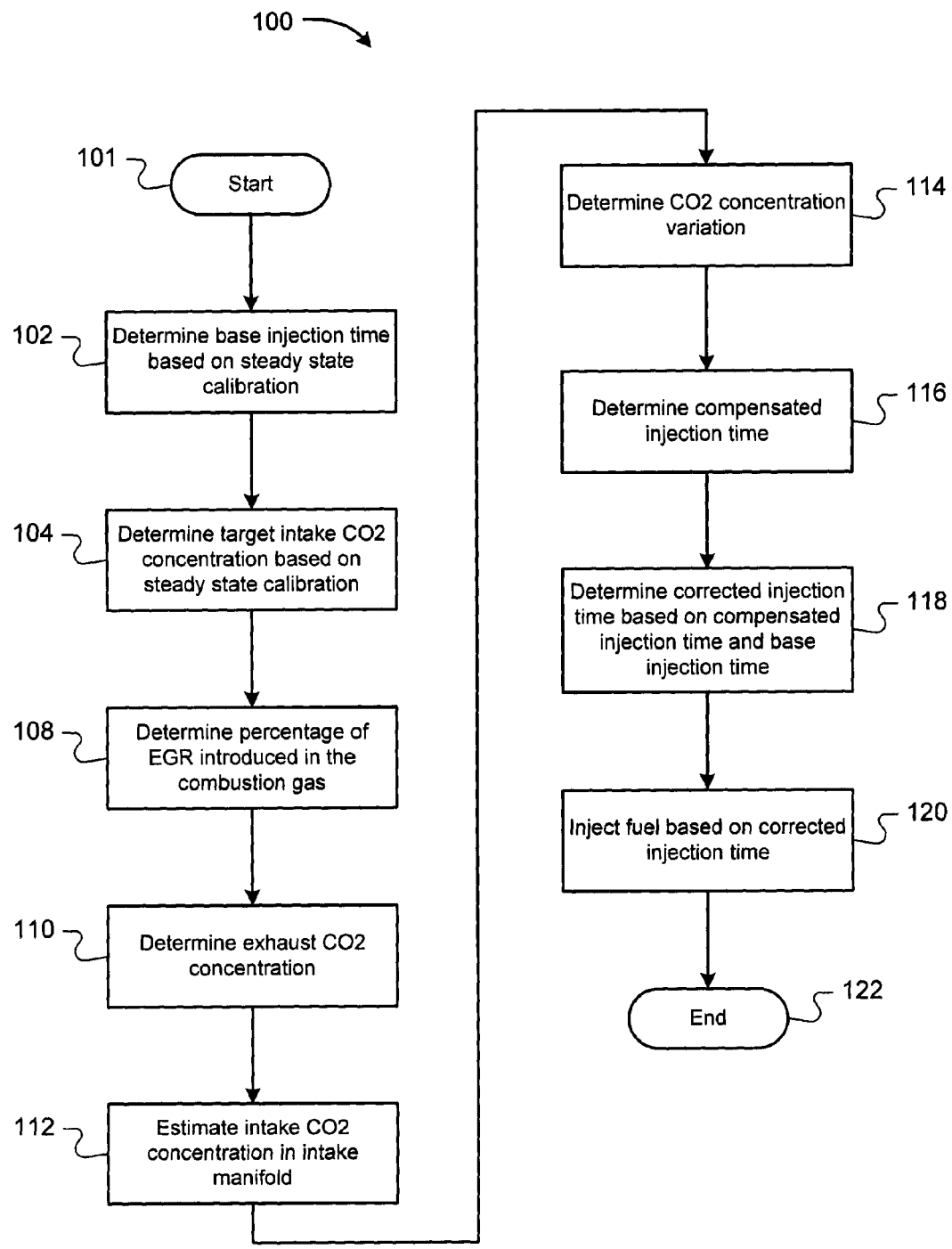
FIG. 4 is a flow diagram that illustrates the steps of a diesel transient combustion control method according to the present disclosure.

Referring to FIG. 4, a diesel transient combustion control method 100 starts in step 101. In step 102, base injection time is determined based on steady state calibration. In step 104, target intake $CO_2$ concentration is determined based on steady state calibration. In step 108, percentage of EGR introduced in the combustion gas is determined. In step 110, exhaust $CO_2$ concentration is determined. In step 112, intake $CO_2$ concentration in the intake manifold is estimated. In step 114, $CO_2$ concentration variation is determined. In step 116, compensated injection time is determined. In step 118, corrected injection time is determined based on compensated injection time and base injection time. In step 120, fuel is injected based on corrected injection time. The diesel transient combustion control method 100 ends in step 122.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An engine control module comprising:
   a target intake carbon dioxide (CO2) module that determines a target intake CO2 concentration; and
   an intake CO2 estimation module that estimates an actual intake CO2 concentration,
   wherein said engine control module adjusts fuel injection based on said target intake CO2 concentration and said actual intake CO2 concentration.

2. The engine control module of claim 1 wherein said engine control module determines a CO2 concentration variation based on said target intake CO2 concentration and said actual intake CO2 concentration and adjusts said fuel injection based on said CO2 concentration variation.

3. The engine control module of claim 1 wherein said intake manifold CO2 concentration module determines said actual intake CO2 concentration based on at least one of a mass air flow signal, a MAP signal, and an intake manifold air temperature (MAT) signal.

4. The engine control module of claim 1 wherein said intake CO2 estimation module includes an exhaust gas recirculation (EGR) percentage estimation module that determines a percentage of EGR introduced into a combustion gas.

5. The engine control module of claim 4 wherein said EGR percentage estimation module determines said percentage of EGR based on at least one of an intake manifold absolute air pressure (MAP) signal, an exhaust manifold air pressure (EMP) signal, an exhaust manifold air temperature (EMT) signal, and an EGR valve position signal.

6. The engine control module of claim 4 wherein said intake CO2 estimation module further includes an exhaust CO2 concentration estimation module that determines an exhaust CO2 concentration.

7. The engine control module of claim 6 wherein said intake CO2 estimation module further includes an intake manifold CO2 concentration module that determines said actual intake CO2 concentration based on said exhaust CO2 concentration and said percentage of EGR introduced into said combustion gas.

8. The engine control module of claim 6 wherein said exhaust CO2 concentration estimation module determines said exhaust CO2 concentration based on said actual intake CO2 concentration.

9. The engine control module of claim 6 wherein said exhaust CO2 concentration estimation module determines said exhaust CO2 concentration based on at least one of fuel injection timing and a burn rate.

10. The engine control module of claim 1 wherein said target intake CO2 concentration is based on steady state calibration data.

11. The engine control module of claim 10 further comprising a steady state injection timing module that determines a base injection time based on said steady state calibration data.

12. The engine control module of claim 11 further comprising an injection timing compensation module that determines a compensated injection time based on said target intake CO2 concentration and said real time intake CO2 concentration.

13. The engine control module of claim 12 further comprising a fuel injection timing control module that controls fuel injectors based on the base injection time and the compensated injection time.

14. An engine control method comprising:
    determining a target intake CO2 concentration;
    estimating an actual intake CO2 concentration; and
    adjusting fuel injection based on said target intake CO2 concentration and said actual intake CO2 concentration.

15. The method of claim 14 further comprising:
    determining a CO2 concentration variation based on said target intake CO2 concentration and said actual intake CO2 concentration; and
    adjusting said fuel injection based on said CO2 concentration variation.

16. The method of claim 14 further comprising determining said actual intake CO2 concentration based on at least one of a mass air flow signal, a MAP signal, and an intake manifold air temperature (MAT) signal.

17. The method of claim 14 further comprising determining a percentage of EGR introduced into a combustion gas.

18. The method of claim 17 further comprising determining said percentage of EGR based on at least one of an intake manifold absolute air pressure (MAP) signal, an exhaust manifold air pressure (EMP) signal, an exhaust manifold air temperature (EMT) signal, and an EGR valve position signal.

19. The method of claim 17 further comprising determining an exhaust CO2 concentration.

20. The method of claim 19 further comprising determining said actual intake CO2 concentration based on said exhaust CO2 concentration and said percentage of EGR introduced into said combustion gas.

21. The method of claim 19 further comprising determining said exhaust CO2 concentration based on said actual intake CO2 concentration.

22. The method of claim 19 further comprising determining said exhaust CO2 concentration based on at least one of fuel injection timing and a burn rate.

23. The method of claim 14 wherein said target intake CO2 concentration is based on steady state calibration data.

24. The method of claim 23 further comprising determining a base injection time based on said steady state calibration data.

25. The method of claim 24 further comprising determining a compensated injection time based on said target intake CO2 concentration and said real time intake CO2 concentration.

26. The method of claim 25 further comprising controlling fuel injectors based on the base injection time and the compensated injection time.

* * * * *